United States Patent [19]

Goeb

[11] Patent Number: 4,752,926
[45] Date of Patent: Jun. 21, 1988

[54] ORDERWIRE DETECTOR FOR COMMUNICATION SYSTEMS

[75] Inventor: Robert Goeb, Middlesex, N.J.

[73] Assignee: ITT Defense Communications, a division of ITT Corporation, Nutley, N.J.

[21] Appl. No.: 913,917

[22] Filed: Oct. 1, 1986

[51] Int. Cl.⁴ .............................................. H04B 9/00
[52] U.S. Cl. ................................... 370/119; 307/510; 370/76; 379/93
[58] Field of Search ...................... 370/110.1, 111, 76; 375/5; 379/93, 97, 98; 307/234, 510, 518; 328/109

[56] References Cited

U.S. PATENT DOCUMENTS

| | | | |
|---|---|---|---|
| 3,767,860 | 10/1973 | Brown | 328/109 |
| 3,851,112 | 11/1974 | Kusan | 375/5 |
| 3,927,260 | 12/1975 | Amundson et al. | 328/109 |
| 4,449,218 | 5/1984 | Strehl | 370/76 |

Primary Examiner—Michael A. Masinick
Assistant Examiner—L. Van Beer
Attorney, Agent, or Firm—Robert A. Walsh; Thomas N. Twomey; Mary C. Werner

[57] ABSTRACT

A orderwire detector circuit operates to identify whether an orderwire signal is of a digital or of an analog format. The orderwire signal is conveniently combined with a high speed data signal. The circuit operates to filter the high speed data signal from the orderwire signal and then square and retime the orderwire signal by means of a stable clock source. The orderwire signal is delayed by one bit and these bits are then compared to determine whether or not over a long period a certain voltage exists. If the proper voltage level exists after a plurality of samples, then it is assumed that the orderwire signal is a digital signal. Depending on the voltage detected, at the end of a predetermined sampling period, one can therefore discriminate between a signal orderwire signal or a analog orderwire signal.

13 Claims, 1 Drawing Sheet

I = CV DOW
O = AVOW

ORDERWIRE DETECTOR FOR COMMUNICATION SYSTEMS

BACKGROUND OF THE INVENTION

This invention relates to a ordewire detector for a communications system and more particularly to a detector which can be utilized to recover or detect the presence of an analog or digital orderwire signal.

As one can ascertain, much of the communications equipment which exists in the United States utilizes a particular signal format. This is especially true of military communications systems which generally employ a signal which consists of a data signal with a data rate of 72,000 BPS to 2.304 MBPS. The data signal which is usually a digital signal and can be of many particular formats such as an NRZ signal is linearly added to an orderwire signal in order to provide an effective communications link.

The orderwire signal essentially is a low speed data or voice channel signal which is used for maintenance or setup purposes. As indicated, this particular signal format exists in many military communications equipment such as the conditioned diphase family which is capable of transmitting over a fiber optic cable system and employs the signal format to modulate a light emitting diode or other device and then transmit the combined signal over a fiber optic cable or a fiber optic communications link.

Typical examples of the type of equipment which utilize the above-noted signal is the AN/TTC-42, the SB-3865, the TD-1234, the AN/TRC-170, the AN/TTC-39, the AN/TSQ-111, the AN/MRC-139, and the MD-1026. In any event, in certain of these systems, the orderwire used may be of either a digital or analog type. The digital orderwire signal is known as the system orderwire or combined voice digital orderwire (CVDOW). The analog orderwire is known as a maintenance or analog voice orderwire (AVOW).

As one can therefore ascertain, the data signal which is incorporated in such a system is used with an analog or digital orderwire signal. In any event, certain systems would have either the digital orderwire signal or the analog orderwire signal. Suitable examples of the format will be given. As indicated above, much of these systems utilize fiber optic communications links which are employed to interface the equipment to a fiber optic cable. Therefore, the various types of equipment indicated above are all capable of being interfaced to a fiber optic communications link. This requires reformatting of the signal into a signal which is more compatible with a fiber optic system.

In order to accomplish this, one requires separation and recovery of the orderwire signal from the data signal. As indicated above, since the orderwire signal may the CVDOW or AVOW, identification of the orderwire type of signal is required before recovery can be accomplished. In prior art systems the problem of orderwire detection was accommodated either by using a manually operated switch to specify digital or analog orderwire or using digital counters which operate to compare bits and to maintain a digital count of the results and then operating to compare alternate bits in the data stream. This technique was expensive and complicated.

It is, therefore, an object of the present invention to provide a low cost reliable circuit which will enable one to detect the nature of the orderwire signal and therefore to permit efficient recovery of both the digital data signal and the orderwire signal.

BRIEF DESCRIPTION OF THE PREFERRED EMBODIMENT

Apparatus for detecting the presence of a low frequency signal combined with a high rate data signal to determine whether said low frequency signal is an analog or digital signal wherein said low frequency signal is an orderwire signal either of a digital format having a given bit repetition rate with each alternate bit being inverted with respect to a previous bit with said analog signal being between 200–3400 Hz, comprising filter means responsive to said combined signal to provide at an output said low frequency signal, means for sampling said low frequency signal at a given sampling rate selected in accordance with the rate of an anticipated digital signal to provide a series of sampled bits, means for comparing a first bit of said sampled bit series to a previous bit of said sampled series to provide a series of pulses indicative of said first bit being an inversion of said previous bit, and means responsive to said pulses to integrate the same over a given time to provide a first voltage indicative of a digital orderwire signal or a second voltage indicative of an analog signal.

DETAILED DESCRIPTION OF THE FIGURES

Figure 1:
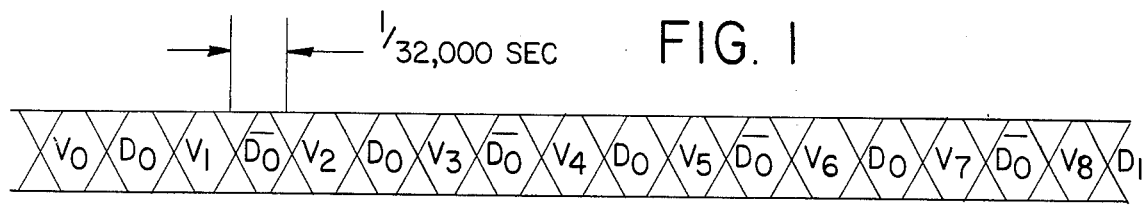
FIG. 1 is timing diagram showing a combined voice digital orderwire (CVDOW) signal and the bit format of the signal.

Referring to FIG. 1, there is shown the format of a combined voice digital orderwire signal (CVDOW). The analog orderwire signal (AVOW) is typically a 200 to 3,400 HZ audio signal. In regard to the signal shown in FIG. 1, one will note the following relationships between the bits. There are a series of bits designated as $V_0$, $V_1$ and $V_2$ and so on. These constitute the digital voice orderwire signal which is also known as the DVOW signal. The bits are at a rate of 16 kilobits per second. (KBPS). The bits $D_0$, $D_1$, are referred to as the digital orderwire signal (DOW) also referred to as the telemetry signal and at a rate of 2 KBPS. It is noted from the diagram of FIG. 1 that the CVDOW signal consists of the DOW signal and the DVOW signal multiplexed as shown in FIG. 1.

Each DVOW bit appears once in a multiplex format. Each DOW bit appears eight times in multiplex format, that is, it appears as four times uninverted and four times inverted. This can be ascertained by looking at the $D_0$ bit and the $\overline{D}_0$ bit which alternate during a complete frame. As seen in FIG. 1, the next frame is the $D_1$ bit which alternates in a similar manner to the $D_0$ bit as shown. In regard to FIG. 1 the CVDOW bit format is clearly indicated. As will be explained, this is the bit format that one desires to detect. If this bit format is detected then one knows that there is a digital orderwire signal. If it is not detected then the orderwire signal is an analog signal.

Figure 2:
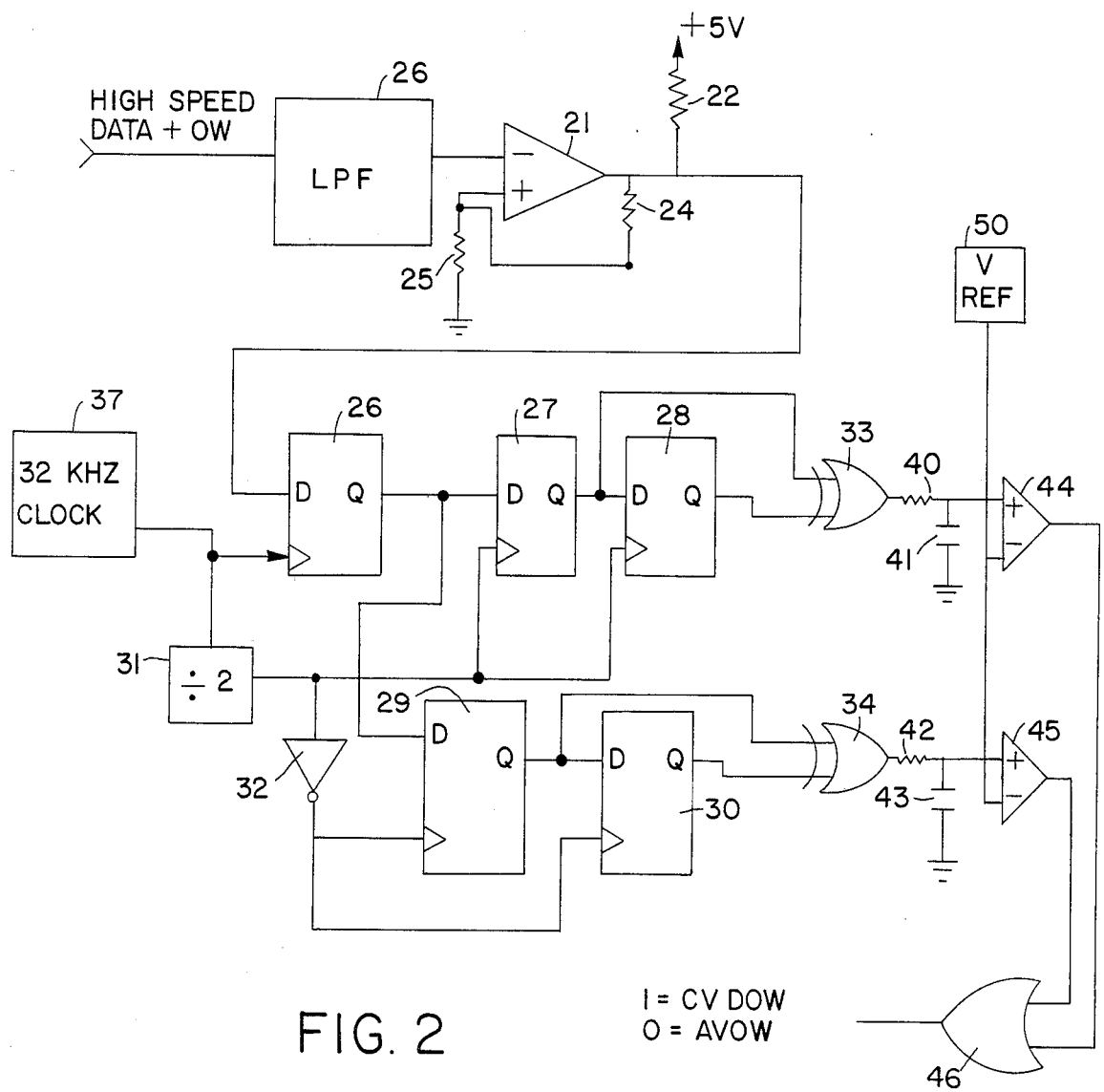
FIG. 2 is a detailed block diagram showing a orderwire detector according to the principles of this invention.

Referring to FIG. 2, there is shown a block diagram of an orderwire detector according to this invention. Referring to FIG. 2 a high speed data plus orderwire signal is first impressed upon the input of a low pass filter which discriminates against the data signal and allows the lower frequency orderwire signal to propagate. Examples of the typical type of signal that is being employed has been described above. Reference is made to U.S. patent application, Ser. No. 678,449, filed on Dec. 5, 1984 and entitled HIGH RATE MODULATOR FOR FIBER OPTIC SYSTEMS by R. Goeb, the inventor herein and assigned to the assignee herein. In that patent application, there is shown examples of a typical high speed data plus orderwire signal and of the type of signal employed herein.

The data reject low pass filter 20 has a 3 DB point at 25 Kilohertz and is used to reject the data and to allow the orderwire signal as the AVOW or CVDOW signal to propagate. As seen, the output of the filter 20 is directed to the inverting input of a comparator 21. The comparator 21 has a load resistor 22 coupled to a source of operating potential and employs a feedback resistor 24 which operates in conjunction with resistor 25 to form a voltage divider. The function of the comparator 20 is to square up the incoming signal after filtering and essentially produce a digital or analog signal with relatively sharp rise and fall times.

The comparator utilizes positive feedback as afforded by resistor 24 and resistor 25 to enable the comparator to reject signals which are less than a certain value in amplitude. The particular resistors as 24 and 25 are selected to reject signals which are less than 0.2 volts peak to peak in amplitude. The output from the comparator 21, as indicated, is a square pulse train. The output of the comparator is directed to the D input of a D type flip-flop 26. The flip-flop 26 has its clock input derived from a stable clock source 37. The clock source 37 may be crystal controlled employing an astable multivibrator or other oscillator configuration.

As indicated, the oscillator may be crystal controlled and is accurate to plus or minus 50 parts per million. The output of the D type flip-flop 26 is therefore a digital CVDOW signal as for example shown in FIG. 1 or a squared up AVOW signal. As one can ascertain, the function of the flip-flop 26 is to retime the output signal from comparator 21 based on the 32 KHZ clock source 37. The Q output of flip-flop 26 is directed to the D input of a flip-flop 27. The flip-flop 27 has its Q output again coupled to the D output of flip-flop 28. It is also seen from FIG. 2 that the Q output of flip-flop 26 is coupled to the D input of flip-flop 29 while the Q output of flip-flop 29 is coupled again to the D input of flip-flop 30. The output from the clock frequency source 37 as indicated above is applied directly to the clock input of flip-flop 26 and also applied to a multivibrator 31 which essentially operates to divide the clock frequency by a factor of two. The divided frequency or a 16 KHZ signal is applied to the clock inputs of flip-flops 27 and 28 and applied to the clock input of flip-flops 29 and 30 via an inverter 32.

The Q output of flip-flop 27 and the Q output of flip-flop 28 are applied to the first and second inputs of an exclusive OR gate 33 while the Q output of flip-flop 29 and the Q output of flip-flop 30 are applied to the two inputs of an exclusive OR gate 34. Each OR gate has its output coupled to an integrating circuit consisting of a resistor 40 and a capacitor 41 for gate 33 and a resistor 42 and a capacitor 43 for gate 34. The junction between the resistor and capacitor is coupled to the non-inverting terminal of an associated comparator as 44 and 45. For example, the junction between resistor 40 and capacitor 41 is coupled to the non-inverting terminal of comparator 44, while the junction between capacitor 43 and resistor 42 is coupled to the non-inverting terminal of comparator 45. The outputs of both comparators are applied to first and second inputs of an OR gate 46. Each comparator receives at its inverting terminal a reference voltage which essentially is provided by a voltage reference source 50. The output of the OR gate 46 provides a binary one for the presence of the CVDOW signal or provides a zero for the analog OW signal or the AVOW signal. The operation of the circuit is as follows.

As indicated above, the output from the low pass filter 20 is applied to comparator 21 where the signal is squared up. The output from comparator 21 is applied directly to the D input of flip-flop 26 and essentially is retimed by the 32 KHZ squarewave clock which emanates from source 37 and is applied to the clock input of flip-flop 26. The output of flip-flop 26 is therefore a digital CVDOW signal as indicated above or a squared up AVOW signal. Let us make the assumption that the signal is the CVDOW signal. This being the case, the signal is then sampled by opposite edges of the 16 KHZ clock which emanates from divider 31. This effectively separates the CVDOW signal into the DOW signal and the DVOW signal channels as shown for example in FIG. 1. The flip-flops 27 and 29 perform this function. Flip-flops 28 and 30 provide a one bit of delay to each of these channels, as one can ascertain. Exclusive OR gate 3 compares bit N to bit N−1 in each channel. As one can see, the exclusive OR gate 33 has one input derived from the Q output of flip-flop 28 and another input derived from the Q output of flip-flop 27.

In a similar manner, the exclusive OR gate 34 has one input derived from the Q output of flip-flop 29 and another input derived from the Q output of flip-flop 30. It is seen that flip-flops 29 and 30 receive the inverted 16 KHZ clock, while flip-flops 27 and 28 receive the non-inverted 16 KHZ clock. Thus each comparator as 44 and 45 are supplied from identical channels which operate to decode the bit stream so that either channel may respond to the DOW signal.

As can be seen from FIG. 1, each DOW bit is repeated eight times: four times uninverted and four times inverted. The exclusive OR gate on the DOW channel therefore produces a positive pulse each time bit N is the inversion of bit N−1. For the DOW signal this will happen seven times out of eight as a minimum. In random data this will happen 50 percent of the time. The RC networks as which are coupled to the outputs of the exclusive OR gate operate to integrate the output. The comparators as 44 and 45 compare the integrated output with the fixed DC reference voltage.

This DC reference voltage is set midway between 50 percent and 87.5 percent of the maximum integrator output. The reference voltage which emanates from source 50 is selected as follows. It was stated above that with DVOW present positive pulses will be produced by its exclusive OR gate as gate 33 seven out of eight times. Over a long period of time, the integrator at the output of the exclusive OR gates will charge to ⅞ of full scale. With random digital data present, the exclusive OR gate will output a 50 percent one-zero density. In this case the integrator will charge to one half of full scale after a long period of time. The outputs of the comparators 44 and 45 are ORED together via gate 46 to produce a digital output where a one valve equals CVDOW present and a zero valve equals AVOW or no orderwire present.

As indicated above, the assumption for the above-described mode of operation was that CVDOW signal was present. In any event, if an AVOW signal was present, it would be squared up by comparator 29 and again sampled at the 32 KHZ clock rate. The AVOW signal is an audio signal, as indicated above, with maximum frequency components at about 3400 HZ. Because of this, the Q output of flip-flop 26 cannot be mistaken for CVDOW which has a strong 8 KHZ component. The 32 KHZ clock source need not be frequency locked to the incoming CVDOW signal since any errors produced by clock to data frequency slip will be integrated out.

As an example, consider clock and data which differ in frequency by 100 parts per million or 3.2 HZ out of 32 KHZ. Assuming that a sampling error was made each time the clock slipped, this would produce 3.2 errors per second. In regard to this there are 16,000 comparisions made each second by the exclusive OR gates as 33 and 34, and it can be seen that such errors due to clock slip are insignificant.

In any event, the above-described circuit operates with relatively simple and inexpensive parts while providing extremely reliable operation. The components employed are conventional integrated circuits available from many different manufacturers. For example, the comparators are LM 139 comparator devices sold as integrated circuits by many manufacturers. The D type flip-flops are 54 HC 74, also sold by many manufacturers. The remaining circuits such as the divider are also the subject matter of commercial integrated circuits, and for example, the circuit designated as 54 HC 74 would be a suitable example for a divider circuit. The inverter 32 may be implemented by an integrated circuit designated as 74 HC 04. The 32 KHZ clock source is available from many different sources and the implementation of the low pass filter 20 is also well known.

As one can therefore ascertain, the above scheme is relatively simple and reliable and will operate to detect the digital orderwire or an analog orderwire signal impressed upon a typical high speed data signal.

What is claimed is:

1. Apparatus for detecting the presence of a low frequency signal combined with a high rate data signal to determine whether said low frequency signal is an analog or digital signal wherein said low frequency signal is an orderwire signal either of a digital format having a given bit repetition rate with each alternate bit being inverted with respect to a previous bit or an analog format with an analog signal being between 200–3400 Hz, comprising:
   filter means responsive to said combined signal to provide at an output said low frequency signal;
   means for sampling said low frequency signal at a given sampling rate selected in accordance with the rate of an anticipated digital signal to provide a series of sampled bits;
   means for comparing a first bit of said sampled bit series to a previous bit of said sampled series to provide a series of pulses indicative of said first bit being an inversion of said previous bit;
   means responsive to said pulses to integrate the same over a given time to provide a first voltage indicative of a digital orderwire signal or a second voltage indicative of an analog signal; and
   a squaring comparator having one input coupled to said filter output and including feedback from an output to another input for providing a reference level enabling said comparator to discriminate against low frequency signals below said reference level, and to provide at an output a squared version of said low frequency signal,
   said sampling means including a first D type flip-flop having a clock input, with the D input of said flip-flop coupled to the output of said comparator and with the clock input of said flip-flop adapted to receive a clock signal indicative of a first sampling rate to provide at a Q output of said flip-flop a retimed low frequency signal, a second D-type flip-flop having the D input connected to the Q output of said first flip-flop and having a clock input adapted to receive said clock signal divided by a factor of two to cause said second flip-flop to sample said first output to provide at the Q output of said second flip-flop a digital signal indicative of first alternate bits in said low frequency signal.

2. The apparatus according to claim 1, further including a third D type flip-flop having the D input coupled to the Q output of said first flip-flop and adapted to receive an inverted clock signal divided by said factor of two to provide at the Q output of said third flip-flop a digital signal indicative of second alternate bits similar to those bits provided by said second flip-flop.

3. The apparatus according to claim 2, further including a fourth D type flip flop having the D input connected to the Q output of said second flip-flop and adapted to receive at the clock input said divided clock signal to provide at its Q output said first alternate bits delayed by a one bit interval.

4. The apparatus according to claim 3, wherein said means for comparing includes an exclusive OR gate having one input coupled to the Q output of said second flip-flop and the other input coupled to the Q output of said fourth flip-flop to provide a pulse at the output when said bit from said second flip-flop is inverted with respect to said bit from said fourth flip-flop.

5. The apparatus according to claim 4 including a first RC integrating network coupled to the output of said exclusive OR gate to integrate said pulses to provide a given voltage level according to the frequency of said pulses.

6. The apparatus according to claim 5, further including a first comparator having one input coupled to said integrating network and responsive to said voltage level and another input adapted to receive a reference level for comparing with said voltage level to determine either one of a presence or absence of pulses to provide at an output an indication of a digital orderwire signal according to said voltage level.

7. The apparatus according to claim 6, further including a fifth D type flip-flop having the D input coupled to the Q output of said third D type flip-flop and adapted to receive at the clock input said inverted clock divided by two to provide at the Q output said second alternate bits delayed by a one bit interval.

8. The apparatus according to claim 7, further including an exclusive OR gate having one input coupled to the Q output of said third flip-flop and one input coupled to the Q output of said fifth flip-flop to provide at an output a pulse when said bit from said third flip-flop is inverted with respect to said bit from said fifth flip-flop.

9. The apparatus according to claim 8, further including a second RC integrating network coupled to the output of said exclusive OR gate to integrate said pulses to provide a given voltage level according to the frequency of said pulses.

10. The apparatus according to claim 9, further including a second comparator having one input coupled to said integrating network and responsive to said voltage level and another input adapted to receive a reference level for comparing with said voltage level to determine the frequency of said pulses to provide an indication of a digital orderwire signal according to said voltage level.

11. The apparatus according to claim 10, further including an OR gate having one input coupled to the output of said first comparator and one input coupled to the output of said second comparator to provide at an output a first signal when either comparator provides said indication indicative of a digital orderwire signal and to provide a second output indicative of an analog orderwire signal.

12. The apparatus according to claim 1, wherein said high rate data signal is between 72,000 BPS to 2.304 MBPS with said digital orderwire signal being at a rate of 16 KBPS.

13. The apparatus according to claim 1, wherein said clock signal indicative of said first sampling rate is at 32 KHZ and said divided clock signal is at 16 KHZ.

* * * * *

UNITED STATES PATENT AND TRADEMARK OFFICE
CERTIFICATE OF CORRECTION

PATENT NO. : 4,752,926
DATED : June 21, 1988
INVENTOR(S) : Robert Goeb

It is certified that error appears in the above—identified patent and that said Letters Patent is hereby corrected as shown below:

Column 1, after the title and before line 5, insert the following as a separate paragraph -- The Government has rights in this invention pursuant to Contract No. N00039-85-C-0645 awarded by the Department of the Navy. --

Signed and Sealed this

Twenty-eighth Day of February, 1989

*Attest:*

DONALD J. QUIGG

*Attesting Officer*   *Commissioner of Patents and Trademarks*